United States Patent Office 2,760,879
Patented Aug. 28, 1956

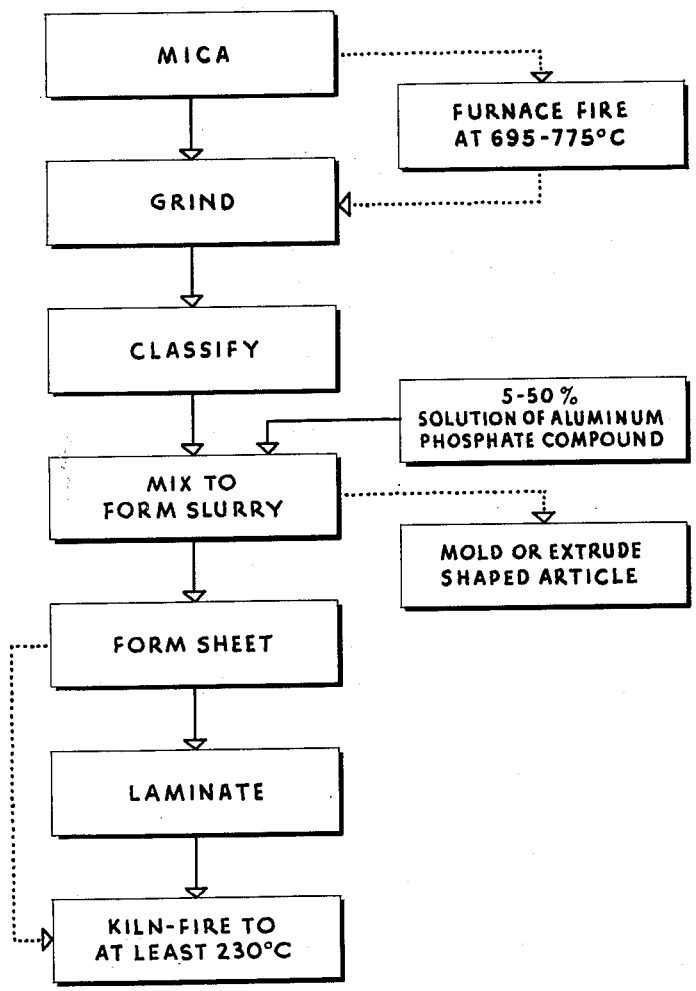
William T. McDaniel, Jr.
Philip N. Sales
INVENTORS

2,760,879
RECONSTITUTED MICA SHEET

William T. McDaniel, Jr., and Philip N. Sales, Asheville, N. C., assignors, by mesne assignments, to Farnam Manufacturing Co., Inc., Asheville, N. C., a corporation of North Carolina Application March 30, 1953, Serial No. 345,736

5 Claims. (Cl. 106—286)

This invention relates to shaped mica articles, and more particularly to a method for making a mica product having improved properties.

Numerous methods are known in the art for producing reconstituted mica sheet from ground mica. However, reconstituted mica sheet produced according to these processes exhibits poor electrical properties above a temperature of 150° C.–200° C. and low strength. If an attempt is made to improve the strength of such mica sheet by impregnation with organic binders, it loses heat resistance; furthermore, many of the organic binders used for impregnation are expensive. While it is known in the prior art to utilize some inorganic binding materials in producing reconstituted mica sheet, these processes generally employ expensive film mica such as muscovite and phlogopite. Further, such inorganically-bonded mica does not have the desired strength at high temperatures.

It is an object of the present invention to provide an improved process for producing an inorganically-bonded mica product and the article formed therefrom.

A further object of the invention is to provide a process for producing reconstituted mica sheet having improved properties by utilizing as starting materials a wide variety of fine micaceous materials.

Another object of the invention is to provide an inexpensive process for producing shaped mica articles having improved electrical and heat insulating properties, greater uniformity, better machinability, higher strength and chemical inertness.

Other objects of the invention will appear hereinafter.

The accompanying flow sheet represents the preferred method of producing mica sheets and shaped articles from micaceous materials. The blocks connected by dotted lines are optional or alternative steps of the process.

In accordance with the present invention, shaped mica articles having improved properties are obtained in the following manner. The mica to be bonded is subjected to a grinding operation, after which it is sized and classified. The ground mica is then mixed with the binder. The binder used is a solution of an aluminum phosphate having a composition of or between monoaluminum dihydrogen phosphate and dialuminum monohydrogen phosphate (having the ratio $1Al_2O_3:3P_2O_5$ to $2Al_2O_3:3P_2O_5$). Excess liquid is removed from the slurry and the resultant mass may then be formed into the desired shape and dried to produce the finished article. If mica paper or board is being prepared, the slurry can be filtered to form a sheet. The sheet is then subjected to a temperature of at least 230° C. with the application of pressure, if desired. Articles having intricate shapes may be formed by partially dehydrating the sheet before drying and subjecting the partially dehydrated sheet to a rolling, cutting, or molding operation to obtain the proper shape.

The mica article formed by the above steps is strong, very resistant to heat and practically all chemicals, is not soluble in water or most organic solvents, and has good dielectric strength and excellent arc resistance. Its properties make it useful as a heat and electrical insulation for such applications as heater plate for toasters, irons, percolators, etc., as segment plate and V-rings in motors, and for use as heat- and electrically-insulating troughs, liners, tubes, washers, etc.

The various operations involved in the present invention will now be described in detail in the paragraphs which follow.

PREPARATION OF MICA

Various types of muscovite are suitable for use in this process. For example, mica washer or "jig" plant concentrates, froth flotation concentrates, shop and mine scrap, punch mica, and flake mica recovered by Humphreys spiral concentrators may be used. Other micaceous materials which can also be employed are phlogopite, biotite, chlorite, and exfoliated or unexfoliated vermiculite. The material to be bonded in this process should be relatively fine-sized (minus ½ inch in diameter) so that a uniform, smooth sheet can be formed in the filtering, molding or extruding step. Those raw materials not already in such a fine state must be ground by suitable means.

The thickness of mica flakes is not critical in this process, whereas in processes in which molecular attraction and "nascent" properties of the films are depended on for the binding force, extreme thinness of the flakes is an obsolute necessity. Mica for use in the present invention can be prepared by simple procedures using conventional, mineral treating equipment.

The usual mica preparation procedure consists of grinding in a rod mill with sufficient water to form a 25 to 60 per cent solids slurry and with a small quantity of dispersant (e. g. 0.2 to 2.0 lbs. of $Na_4P_2O_7.1OH_2O$, sodium silicate, or NaOH per ton of new feed) if appreciable clay or iron oxide staining is present. Rod mill discharge is screened to remove large particles which might interfere with subsequent classification. Screen oversize is returned to the rod mill. Screen undersize is fed to any type of wet classification device (mechanical classifiers, sand tanks, or hydraulic classifiers, including centrifugal classifiers) which separates the thinner and/or smaller flakes from the thicker and/or larger flakes. The classifier fraction containing the thicker books of mica is returned to the rod mill for additional grinding and delamination. The lower bulk density product from the classifier is then deslimed by standard types of classifiers, preferably of the centrifugal type. Desliming serves not only to remove slimes and iron oxides which are freed from the mica by attrition in the presence of a dispersant in the rod mill, but also removes the majority of the water from the pulp. All mica fed to the mill is recovered in the deslimed product except for a small percentage, usually less than 5%, lost as slimes and extreme fines. Other mills which are satisfactory for wet grinding the mica are hammer mills, disc mills, pebble mills and agitator type grinders.

Mica ground and classified as described above will usually all pass a 16 mesh screen and has a bulk density of between 10 and 20 pounds per cubic foot.

If an iron or steel grinding mill is used, and if good electrical properties are desired in the finished product, the ground mica should be passed through a magnetic separator in order to remove abraded iron particles.

Although mica produced as above is satisfactory for many uses, improved strength and electrical properties can be obtained by using mica which has been more thoroughly delaminated by one of two procedures described below.

One procedure which has been used for producing highly-delaminated or very thin films of mica is in part like the above-described procedure, but in addition a number of screening and classifying steps is included. By increasing the number of combined classification and screening steps or by increasing the size of the screen openings, the bulk density of the product can be made progressively lower with consequent improvement in the final board.

A second procedure for producing highly delaminated flakes involves firing of muscovite mica prior to grinding. Satisfactory results have been obtained by firing the mica to between 695° C. and 775° C. At the lower temperature (695° C.) 30 to 60 minutes firing time is necessary to obtain the desired degree of dehydration and consequent decrepitation; whereas at 775° C., 10 to 20 minutes firing time is sufficient. After this treatment, the appearance and flexibility of the mica is only slightly changed; however, the laminae are sufficiently opened up so as to make possible a highly delaminated ground mica product and consequently an improved mica board. The fired mica, after grinding, may be treated by classification alone or by the series of sizing and classifying steps just described in order to remove varying amounts of the heavier and thicker mica particles.

MIXING WITH BINDER

After grinding or other preparation, one part of mica is mixed with from about 3 to about 30 parts of a solution of an aluminum phosphate compound having a composition of or between monoaluminum dihydrogen and dialuminum monohydrogen phosphate. One method of preparing these water soluble aluminum phosphates is described in Patent No. 2,405,884, issued August 13, 1946. Bonding can be obtained with solutions varying in strength from 5 to 75% of the phosphate compound. The concentration of binder in the final, fired sheets varies from approximately 5% of the total weight when 10% solution is used, to 50% or over when a 50% to 60% solution is used. The percent binder retained in the sheet will not only vary with the original solution strength but also with variations in the type mica, degree of filtering, and firing procedure. The physical strength is usually improved by an increase in the percentage of aluminum phosphate. However, large concentrations of aluminum phosphate tend to impair the electrical properties. Due to a marked decrease in viscosity of solutions of aluminum hydrogen phosphate with only small amount of dilution at concentrations near 45%, a noted decrease in filter time occurs with this dilution; therefore, solution strengths below 47.5% are customarily employed.

FORMATION OF SHEET

The mica-aluminum hydrogen phosphate slurry of a suitable consistency for efficient filtering (for example, from 3 to 30% by weight of mica) after thorough mixing is introduced into a filter. Excess aluminum hydrogen phosphate solution is removed by vacuum filtration, after which the formed uncured sheet is removed from the filter cloth.

When moderate to coarse size mica flakes (larger than approximately 48 mesh) are incorporated in the sheet, a slight degree of movement between the unfiltered slurry and the filter cloth or between the unfiltered slurry and the formed portion of the cake is necessary to prevent irregularities in the sheet. This movement and the desired uniformity are obtained by a gentle circular motion when using a round Buchner funnel filter or by a reciprocating motion as when using a 16″ x 24″ filter box mounted on a shaking table. In a continuous operation utilizing a Fourdrinier-type machine the flow of slurry onto the traveling filter medium will cause the formation of uniform sheets.

Filter cloths made of nylon, glass cloth, brass and stainless steel can all be used successfully. None of these materials sticks to the filter cake or deteriorates noticeably from contact with the aluminum hydrogen phosphate solutions.

The time necessary for complete filtration of the sheets varies with the thickness of the sheet, the size and degree of delamination of the mica, the concentration of the aluminum hydrogen phosphate solution, and the amount of vacuum. After the time at which the sheet is initially formed in the filter, filtration may be continued for from ½ to 10 minutes in order to more thoroughly consolidate and dry the sheet and thereby to facilitate its removal from the filter cloth. Filter time can be shortened appreciably by heating the solution and thereby decreasing its viscosity.

Technique other than filtration may be used to form the slurry into the desired shape. For example, intricately shaped articles may be formed by molding or extruding thick pastes of a mixture of mica and binder. The molding may be done without heat, in which case the shaped article is later dried and fired to at least 230° C. A stronger article results, however, if it is fired while under pressure. Pressure varying from 200 to 10,000 pounds per square inch has been successfully employed in these procedures.

PROCESSING SHEET

By partially dehydrating the sheet, it can be made pliable, tough and slightly elastic. Advantage has been taken of this condition to bend the sheet into intricate shapes which can be permanently held by subsequent drying and firing or by firing in a mold under pressure. These procedures can be used to form uniform tubes of small diameter, V-rings for motors, and other shapes such as are now made from organically-bonded mica. Rolling or otherwise applying pressure to the pliable, partially dehydrated sheet may be employed to increase the uniformity and density of the material. A third advantage which can be taken of the plastic condition, is the cutting of intricate shapes such as commutator segments and insulator strips for toasters, electric irons and coffee percolators by various dies, such as steel rule and compound dies. Whereas small shapes such as teeth are partially weakened by fracturing if the sheets are cut after complete firing and hardening, maximum strength without fracturing is obtained by cutting while pliable.

Drying time will vary, depending on the temperature and on the desired degree of pliability. The usual drying schedule for a 20-mil sheet prior to rolling, cutting or shaping is 10 to 30 minutes at from 40° to 110° C. Lower temperatures and longer periods of time are necessary for drying sheets made of highly delaminated mica than for those made of rather thick flakes because of the tendency of the former to bubble during fast drying schedules.

Sheets may be dried to the plastic state while either on or off the filter cloth. In a continuous operation it is preferable to partially dry them while on the cloth, such as with infra-red lights, so as to strengthen them and facilitate their removal from the cloth.

Sheets may be stored indefinitely while in the partially-dried, plastic state. The amount of free moisture in the sheet and therefore its softness and pliability will vary with atmospheric conditions; however, unless these conditions become extreme the sheet does not become too hard or soft for satisfactory handling, cutting or forming. By controlling the moisture content of the sheet such as by drying or, conversely, by spraying with water, the desired pliability can be secured after any period of storage or degree of original drying.

FINAL DRYING OR CURING

If such non-reacting or practically non-reacting substances as muscovite, phlogopite or synthetic phlogopite, are bonded with the aluminum hydrogen phosphates, the curing or maturing of the formed green body or sheet is accomplished by firing the material to at least 230° C.

At approximately 230° mono-aluminum phosphate becomes permanently resistant to water due apparently to the formation of $Al_2O_3.3P_2O_5.3H_2O$. Aluminum metaphosphate forms at a temperature of 500° C. and decomposition, due to volatilization of $P_2O_5$, does not occur until above 1500° C. These reactions seem to be gradual and no serious disruption of the sheet or loss of strength occurs after firing to temperatures up to at least 1100° C. In fact, even though muscovite flakes decrepitate and partially disintegrate at temperatures as low as 650° C., a sheet formed from muscovite and one of the aluminum phosphate binders can be heated to 1100° C. without serious loss in strength. This effect is apparently due to the relatively large amount of aluminum phosphate compounds present which holds the sheet together firmly in spite of the disintegration or even melting of the other component or components, such as mica, present.

If well-delaminated mica is not incorporated in the sheet or body and if high physical strength in the sheet is desired, it is necessary to press the sheet or body at pressures of 200 p. s. i. or greater during the time that it is being fired to 230° C. or above.

Firing time may be varied from 3 minutes to 4 or more hours depending on pressure, temperature, and degree of previous drying.

The following examples will further illustrate the invention:

*Example I*

This example describes the most common board forming technique. Although it is the simplest method normally employed, involving no elaborate grinding and no pressing during firing, it produces a product suitable for most uses. Muscovite shop-scrap was ground for approximately 10 minutes in a rod mill with sufficient water to produce a 25 to 50 percent solids slurry and with hydrous sodium pyrophosphate added as 1 part for each 2000 parts of mica. The ground pulp was classified as an elutriator with water rising at a rate of about one foot per minute. Approximately 60 percent of the mica fed to this classifier sank because of the weight and shape of the particles and this "sink" product was returned to the rod mill, with unground shop-scrap, and was reground and reelutriated as above. Mica particles in the elutriator overflow were dewatered and deslimed by simple decantation so as to remove slimes and fine mica particles having a settling rate in water of less than one foot per hour. The deslimed elutriator overflow was passed through a Franz ferrofilter to remove abraded iron particles.

Three hundred grams of elutriator overflow product was mixed with 1200 cc of a 40 percent water solution of monoaluminum dihydrogen phosphate. This mixture was poured into a 16 x 24 inch filter box which was moved back and forth 250 times a minute along a ½ inch path during vacuum filtration. When the mica sheet became consolidated it was lifted off the filter together with the 80 mesh screen cloth on which it was formed. After placing the sheet on an asbestos board, the filter cloth was lifted away.

After being dried 2 hours at 60° C. the flexible mica board was cut into 2 pieces of equal size which were laminated together by wetting adjacent surfaces with a 40 percent solution of monoaluminum dihydrogen phosphate, and pressing the sheets together momentarily at a pressure of 100 p. s. i. The laminated material was then completely and permanently hardened and cured by firing in an oven in which the temperature was raised from 100° C. to 330° C. during a two-hour period and was then lowered from 330° C. to 30° C. over the next two-hour period.

The cured board was ground to a thickness of 0.0450±0.0005 inches and was cut into 1 x 1 inch squares on a band saw. These squares were tested by a major producer of electric motors for possible commutator segment usage. All properties tested—including compressibility, arc resistance, uniformity, moisture resistance, surface leakage, and dielectric strength—were satisfactory to excellent. The dielectric strength of this material as measured with ¼ inch diameter electrodes was approximately 250 volts per mil thickness. The modulus of rupture was 6,500 p. s. i.

*Example II*

In Example II, a green or uncured sheet was made by almost the exact procedure described in Example I. However, pressure was applied during firing and, as a result, most of the properties of the finished board were superior to those of the board formed in Example I.

Thoroughly dried sheets (40° C. for 150 min.) were fired under a pressure of 400 p. s. i. and at a temperature gradient increasing from room temperature to 400° C. in 30 min. and then decreasing to 200° C. in 30 min., at the end of which time the cured sheets were removed from the press. The apparatus consisted of a hydraulic press with 6 x 6 inch plates, 400 watt Nichrome-wound mica or mica-phosphate board heating elements, and separating plates of either steel, aluminum foil, mica-phosphate board, or sheet mica.

This pressure treatment caused an increase in the modulus of rupture of from 6,500 p. s. i. in the case of Example I to 13,000 p. s. i. in this example.

*Example III*

In this test, the influence of highly delaminated mica flakes was studied. After being ground in a rod mill as in Examples I and II, the mica was classified by elutriation into four fractions having different settling rates. Each of these classified fractions was screened so as to recover the larger and consequently thinner flakes in each. In this case, screen sizes were such as to recover 23% of rod mill discharge in the delaminated product.

A sheet was formed in an eleven-centimeter Buchner funnel by first filtering a slurry of 10 grams of mica in 150 cc. of water, and then adding 25 cc. of a 50 percent water solution of monoaluminum dihydrogen phosphate to bond the mica flakes.

After curing at 350° C. this sheet had a dielectric strength of 354 volts per mil and a modulus of rupture of 8,800 p. s. i. as compared with 250 volts per mil and 6,500 p. s. i. in Example I in which a simpler mica preparation step was used.

*Example IV*

Highly delaminated mica flakes, obtained by firing shop-scrap muscovite prior to grinding, were incorporated in a sheet which was fired while under light pressure. The exact procedure was as follows:

Muscovite shop-scrap was fired 15 minutes in an automatically-controlled electric furnace at an average temperature of 770° C. Moderate and uniform decrepitation of the mica, indicated by small air bubbles and a pearly lustre, resulted from this treatment. This fired mica was ground 4 minutes at 25 percent solids and with 2 lbs. of hydrous sodium phosphate per ton of mica. The ground mica was then classified and "ferrofiltered" by the procedure described in Example I.

A sheet was formed by filtering a slurry of 60 grams of the ground mica in 200 cc. of a 40% water solution of monoaluminum dihydrogen phosphate in a 12 inch diameter Buchner-funnel filter. A gentle circular motion was imparted to the filter during vacuum filtration in order to aid in orienting the flakes parallel to the nylon cloth filter medium and thereby forming a uniform sheet.

The filtered sheet was dried under infra-red lights for 3 hours after which it was fired for 15 minutes at temperatures increasing from room temperatures to approximately 300° C. while under a pressure of 200 p. s. i., using the same apparatus as in Example II.

The fired sheet was 0.015 inch thick, had a dielectric strength of 625 volts per mil thickness and had a modulus of rupture of 14,000 p. s. i.

Reconstituted mica prepared in accordance with the present invention has greater strength than unimpregnated reconstituted mica produced in accordance with prior patents. For example, reconstituted mica prepared in accordance with the methods disclosed in U. S. Patents Nos. 2,549,880 and 2,405,576, initially has heat resistance comparable with reconstituted mica prepared according to the present invention, but it does not have sufficient strength. However, if an attempt is made to improve its strength by subsequent impregnation, particularly with organic binders, it loses some heat resistance and is no longer comparable in this respect to the mica of the present invention. In addition, the impregnated mica and all organically-bonded mica boards have poor electrical properties above a temperature of 150 to 200° C. The aluminum phosphate-bonded material is therefore the only one of these materials which has both excellent strength and electrical properties at high temperatures (200° C. to 1200° C.). Because expensive mica preparation procedures and impregnation with expensive organic compounds is not necessary in the case of the aluminum phosphate-mica board, but is necessary in most other cases, the process described herein is considerably less expensive than the others.

As indicated by its properties, the aluminum phosphate-flake mica board can serve all purposes which any mica paper, impregnated or not, any organically-bonded sheet mica, any inorganically-bonded sheet mica, or sheet mica itself can serve, except those purposes in which considerable flexibility of the final product are necessary. Uses of the aluminum phosphate-flake mica board include: segment plate, molding plate (including V-rings, troughs, liners, and tubes), heater plate (including toaster, iron and percolator strips), various heat and electrical insulating strips, washers, spacers, etc., as used in various electrical and heating equipment, and supports for elements in vacuum tubes, and various lighting and heating bulbs. In addition, the aluminum phosphate-flake mica material has various uses which these other materials do not have due to its distinctive properties. For instance, the properties of high strength, chemical inertness, high heat resistance, electrical insulation, low cost, machinability and moldability make it particularly suitable as a construction material in the chemical, electrical and heating industries. From this standpoint it is equal to or superior to cemented asbestos board, molded plastic, glass-bonded mica, and steatite for many uses in which the above properties are desired. Uses in this category include electrical, chemical and heating furniture such as cabinets, wire supports and insulators, electrical junction boards and boxes, cable insulation pipes, table tops, etc. Boards and molded pieces of this material can be machined, sawed, ground, drilled, threaded, and nailed. This mica board can also be impregnated with any organic or inorganic impregnant if special properties such as low permeability are desired.

While in the partially dehydrated plastic state the mica-phosphate board can be laminated with glass cloth, glass and asbestos fibers, film mica, and various metals, including copper, aluminum and stainless steel. It can also be built up into any thickness by bonding any number of boards together. The bonding or laminating can be accomplished by pressing the sheets together momentarily, or for a length of time, without heating and then drying and firing the material without pressure. An alternate method of bonding or laminating consists of firing the materials while under pressure as in the method previously described for firing individual boards under pressure.

What is claimed is:

1. An improved electric and heat insulating article consisting essentially of 50–95% finely divided, delaminated mica and 5–50% of a bonding agent of a water-soluble aluminum phosphate ranging from mono- to di-aluminum phosphate.

2. An improved electric and heat insulating article consisting essentially of 50–95% finely divided, delaminated mica and 5–50% of a bonding agent of a water-soluble aluminum phosphate ranging from mono- to di-aluminum phosphate, said article having a dielectric strength substantially above 250 volts per mil thickness as measured with one quarter inch diameter electrodes.

3. Mica sheet consisting essentially of 50–95% finely divided, delaminated mica bonded together with 5–50% of a water-soluble aluminum phosphate ranging from mono- to di-aluminum phosphate and cured under heat and pressure, said cured sheet being characterized by high strength and high heat resistance while retaining superior dielectric properties at high temperatures.

4. A process for producing a mica sheet comprising the steps of grinding mica flakes into finely divided, thoroughly delaminated mica particles, mixing the ground mica with a water solution of 5–50% aluminum phosphate ranging from mono- to di-aluminum phosphate to form a slurry, extracting excess liquid from the slurry to form a sheet therefrom and effecting a physical bonding between the aluminum phosphate and the mica in the sheet by heating the same to at least 230° C. while subjecting the sheet to pressure.

5. A process for producing mica products having improved strength and electrical properties which comprises preliminarily heating mica flakes, thereafter grinding the same into finely divided, thoroughly delaminated mica particles, mixing the ground mica with a water solution of 5–50% aluminum phosphate ranging from mono- to di-aluminum phosphate to form a slurry, extracting excess liquid from the slurry to form a sheet therefrom, partially dehydrating the sheet, forming the partially dehydrated sheet into the desired shape and subjecting the shaped product to a temperature of at least 230° C.

References Cited in the file of this patent

UNITED STATES PATENTS

| | | |
|---|---|---|
| 1,975,080 | Boughton et al. | Oct. 2, 1934 |
| 2,405,884 | Greger | Aug. 13, 1946 |
| 2,420,475 | Greger | May 13, 1947 |
| 2,425,152 | Greger | Aug. 5, 1947 |
| 2,444,347 | Greger | June 29, 1948 |
| 2,549,880 | Bardet | Apr. 24, 1951 |
| 2,614,055 | De Senarclens | Oct. 14, 1952 |